United States Patent [19]

Dammann et al.

[11] Patent Number: 4,626,069
[45] Date of Patent: Dec. 2, 1986

[54] OPTICAL POWER DIVIDER

[75] Inventors: Hans Dammann, Tangstedt; Ulrich Killat, Hamburg, both of Fed. Rep. of Germany

[73] Assignee: U.S. Philips Corporation, New York, N.Y.

[21] Appl. No.: 141,857

[22] Filed: Apr. 21, 1980

[30] Foreign Application Priority Data

Apr. 21, 1979 [DE] Fed. Rep. of Germany ....... 2916184

[51] Int. Cl.$^4$ ............................ G02B 5/18; G02B 6/34
[52] U.S. Cl. ............................... 350/162.2; 350/96.18; 350/96.19
[58] Field of Search .............. 350/96.15, 96.18, 96.19, 350/162 R, 162.2, 162.23

[56] References Cited

U.S. PATENT DOCUMENTS

| | | | |
|---|---|---|---|
| 4,148,556 | 4/1979 | Sauter et al. | 350/96.19 X |
| 4,198,117 | 4/1980 | Kobayashi | 350/96.19 |
| 4,213,677 | 7/1980 | Sugimoto et al. | 350/96.18 |
| 4,257,673 | 3/1981 | Matthijsse | 350/96.19 |

FOREIGN PATENT DOCUMENTS

| | | | |
|---|---|---|---|
| 0102136 | 8/1979 | Japan | 350/96.19 |
| 7714270 | 6/1979 | Netherlands | 350/96.18 |

OTHER PUBLICATIONS

Knop, "Color Pictures Using the Zero Diffraction Order of Phase Grating Structures", *Optics Commun.*, vol. 18, No. 3, Aug. 1976, pp. 298–303.

"Verzweigungseinrichtungen in mehrwelligen optischen Datennetzen", by W. Meyer, Mikrowellen Magazin, Feb. 1978, pp. 153–158.

*Primary Examiner*—John Lee
*Attorney, Agent, or Firm*—Marc D. Schechter

[57] ABSTRACT

An optical power divider for use with one incoming and a plurality of outgoing glass fibers includes an imaging device arranged on an optical axis between the incoming and outgoing glass fibers. At least one plane binary phase grating is disposed in the pupil of the imaging device. The grating is one-dimensional, has a duty factor of at least substantially 1:1, and has an optical path difference of at least substantially $$H = 0.32\lambda + n\lambda$$

or $H' = 0.5\lambda + n\lambda$ where $n = 0, 1, 2 \ldots$. The end of the incoming glass fiber is coaxial with the optical axis. The outgoing glass fibers are arranged in such a way that they receive the radiation which has been diffracted into the various diffraction orders of the phase grating. $\lambda$ is the wavelength of the radiation.

11 Claims, 5 Drawing Figures

OPTICAL POWER DIVIDER

BACKGROUND OF THE INVENTION

The invention relates to an optical power divider, for use with one incoming and a plurality of outgoing glass fibers. The invention includes an imaging device, arranged on an optical axis between the incoming and outgoing glass fibers, for transmitting radiation travelling through the incoming glass fiber to the outgoing glass fibers.

Such an optical power divider is known from the article "Verzweigungseinrichtungen in mehrwelligen optischen Datennetzen" by W. Meyer, published in Mikrowellen Magazin, 2/78, pages 153–158. The power divider represented in FIG. 6 by reference numeral 8, a so-called selfoc coupler, comprises two Selfoc (trademark) lenses arranged on one axis as well as one incoming and two outgoing glass fibers which are rigidly connected to the Selfoc lenses. The Selfoc lenses are cylindrical lenses whose optical axis are the cylinder axes. These lenses have such a radial refractive-index profile that a light point situated on the entrance surface of the Selfoc lens and on the optical axis can leave a Selfoc lens of suitable length as a parallel beam. By means of a semi-transparent mirror (beam splitter) arranged between the Selfoc lenses, which mirror has been combined in a unit with the lenses, the radiation passing through the incoming glass fiber is divided between two outgoing glass fibers. However, realizing such a power divider is comparatively intricate and demands several accurate manufacturing operations.

Furthermore, so-called star couplers are also disclosed in the Meyer publication. A star coupler is a multiple power divider in which the individual glass fibers of a data network come together and the signal power applied to one transmission line is uniformly distributed among a plurality of receiving lines. In the simplest case such a multiple power divider is made of a cylindrical cladded-core rod of a few centimeters in length and approximately 1 millimeter diameter. The end faces of the individual glass fibers abut the end faces of the rod (see FIGS. 7, 8 of the Meyer publication). However, multiple power dividers of this type have considerable power losses, which lie between approximately 5 and 8 dB.

SUMMARY OF THE INVENTION

It is therefore an object of the invention to provide a power divider which is simple to make, in which the power taken from the incoming glass fiber is distributed as uniformly as possible among a plurality of outgoing glass fibers and in which the power is coupled into the individual outgoing glass fibers with optimum efficiency. Furthermore, it is an object of the invention to provide a power divider, of small dimensions adapted to glass-fiber technology, which also has a high mechanical strength.

These objects of the invention are achieved in that in the pupil of the imaging device there is situated at least one plane binary phase grating which is one-dimensional, which has a duty factor of at least substantially 1:1, and which has an optical path difference of at least substantially $$H = 0.32\lambda + n\lambda$$

or $$H' = 0.5\lambda + n\lambda$$

where $n = 0, 1, 2 \ldots$.

The end of the incoming glass fiber is coaxial with the optical axis. The outgoing glass fibers are arranged in such a way that they receive the radiation which has been diffracted into the various diffraction orders of the phase grating. $\lambda$ is the wavelength of the radiation.

A radiation beam which passes through the incoming glass fiber is diffracted into different diffraction orders upon entry into the imaging device in whose pupil a phase grating is disposed. In the case of a 1:2 power divider, in which the incident radiation is distributed between two outgoing glass fibers, two diffraction orders of equal intensity are obtained. However, in the case of a 1:3 power divider, three diffraction orders of equal intensity are obtained. A uniform distribution of the power among the outgoing glass fibers is thus obtained. A specific distribution ratio of the power divider can then be obtained by varying the optical path difference of the relevant phase grating. For a 1:2 power divider an optical path difference of at least substantially $H' = 0.5\lambda$ is required, while for a 1:3 power divider a phase grating with an optical path difference of at least substantially $H = 0.32\lambda$ is required, if $n = 0$ is selected.

In comparison with known power dividers power dividers of this type have a substantially higher efficiency of coupling the power into the outgoing glass fibers, i.e. they have substantially smaller power losses.

Binary phase gratings have only two different grating amplitudes. If in addition they have a duty factor of 1:1, half their area within one grating period is covered with the grating structures having one of the two grating amplitudes. By means of such phase gratings, the power is coupled into the outgoing glass fibers with a comparatively high efficiency, so that the power losses are substantially reduced.

In accordance with a very advantageous embodiment of the invention the imaging device comprises two Selfoc lenses arranged on one optical axis. Between the lenses is a phase grating, arranged parallel to the end surfaces of the Selfoc lenses and perpendicular to the optical axis.

Upon entering the first Selfoc lens a radiation beam travelling through the incoming glass fiber is widened into a parallel radiation beam because of the lenses special radially-symmetrical refractive index profile. The lengths of the two Selfoc lenses, which are cylindrical and whose refractive index decreases in a raidally outward direction, has been selected so that they image the point-shaped radiation source at the exit of the incoming glass fiber in a 1:1 ratio onto the outer end surface of the second Selfoc lens. Owing to the phase grating arranged in the parallel radiation path between the two Selfoc lenses additional images of the point-shaped radiation source are formed at the location of the ±1st diffraction order at a distance 1 from the zeroth diffraction order. The glass fibers at this location receive the radiation and transmit it further.

In this respect it is advantageous that the incoming and outgoing glass fibers are directly connected, for example cemented, to the outer end surfaces of the Selfoc lenses, so that the glass fibers can be positioned without any further aids.

In a suitable embodiment of the invention two mutually parallel phase gratings are disposed between the Selfoc lenses. These gratings are arranged on the optical axis, shifted axially relative to each other, and each have an optical path difference of H'=0.5λ. Their grating lines are rotated through a chosen angle relative to each other.

By rotating two such phase gratings relative to each other a 1:4 power divider can be obtained in a simple manner. The radiation emerging from the incoming glass fiber is thus distributed among four outgoing glass fibers, which receive the radiation in the four available diffraction orders.

In a further advantageous embodiment of the invention two mutually parallel phase gratings are disposed between the Selfoc lenses. These gratings are arranged on the optical axis, shifted axially relative to each other each have an optical path difference of H=0.32λ, and their grating lines are rotated through an angle relative to each other, so that in a simple way a 1:9 power divider can be obtained.

In another advantageous embodiment of the invention two mutually parallel phase gratings are disposed between the Selfoc lenses. These gratings are arranged on the optical axis, shifted axially relative to each other, one grating having an optical path difference of $H=0.32\lambda$ and the other having an optical path difference of $H'=0.5\lambda$, and their grating lines are rotated through an angle relative to each other. By combining two such phase gratings, a 1:6 power divider can be obtained in a simple manner.

In accordance with a further advantageous embodiment of the invention a one-dimensional phase grating is formed in one of the facing end surfaces of the Selfoc lenses, for example by reactive sputtering, so that the power divider comprises a smaller number of separate components and is thus easier to align and is more mechanically robust.

In another advantageous embodiment of the invention a two-dimensional checkerboard-like phase grating is formed in one of the facing end surfaces of the Selfoc lenses. This grating has an optical path difference of H=0.32λ or H'=0.5λ and is made, for example, by reactive sputtering.

In order to obtain power dividers having a distribution ratio of 1:4 or 1:9, it is possible to arrange, in each case, two phase gratings, which have a duty factor of at least substantially 1:1 and which are rotated through an angle relative to each other, between the Selfoc lenses. The phase gratings each have the required optical path differences. As an example, the two relevant phase gratings may be rotated through, for example 60° or 90° relative to each other. In the case of a rotation through 90° a checkerboard-like amplitude pattern or phase grating is obtained. This can be simply formed in one of the facing end surfaces of the Selfoc lenses, for example by photolithographic techniques in combination with a wet-chemical etching process or in combination with reactive sputtering.

In the case of reactive sputtering the glass or quartz surfaces exposed during the photolithographic process are removed by a chemical reaction which forms a volatile compound. The resulting structure has an excellent definition.

In this way separate phase gratings, which are rotated 90° relative to each other and which must be mounted separately between the Selfoc lenses, may be dispensed with, so that the power divider is easier to align and has an improved stability.

DESCRIPTION OF THE PREFERRED EMBODIMENTS

Figure 1:
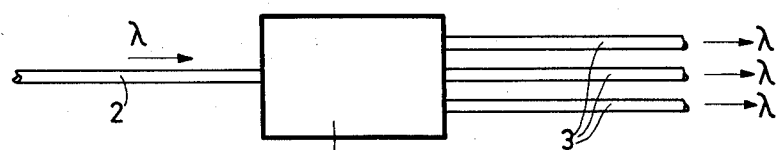
FIG. 1 schematically represents an optical power divider.

FIG. 1 schematically represents a power divider 1 (or multiple power divider or star coupler). The signal power which is applied to the power divider 1 via a receiving line 2 (incoming glass fiber) is uniformly distributed among a plurality, for example three, of transmission lines 3 (outgoing glass fibers) by the divider.

Figure 2:
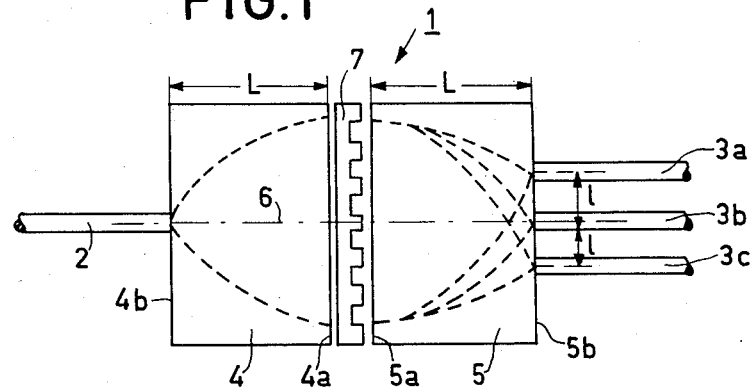
FIG. 2 represents a power divider with a binary phase grating arranged between two Selfoc lenses.

FIG. 2 shows such a power divider 1 in detail. It comprises two cylindrical Selfoc lenses 4 and 5, which are arranged on a common optical axis 6, which is also the cylinder axis of the Selfoc lenses 4 and 5. Between the two Selfoc lenses 4 and 5 a plane one-dimensional or linear phase grating 7 is located. Grating 7 is of the binary type, has a duty factor of at least substantially 1:1, and is disposed parallel to the facing end surfaces 4a and 5a of the Selfoc lenses 4 and 5. By means of such a power divider 1 it is, for example, possible to couple the signal power applied via the receiving line 2 into three transmission lines 3a, 3b, and 3c. The cross-sectional area of the receiving line 2, which is rigidly connected, for example cemented, to the Selfoc lens 4, is concentric with the optical axis 6. As the diameter of the receiving line 2 is substantially smaller than that of the Selfoc lens 4, a substantially point-shaped radiation source, situated on the optical axis 6, is formed on the outer end surface 4b of the Selfoc lens 4 during the transmission of optical signals. The rays issuing from this point are converted into a parallel radiation beam by the special radially-symmetrical refractive index profile and by the selected length L of the Selfoc lens 4. The parallel beam produced is perpendicular to the end surface 4a of the Selfoc lens 4. As the Selfoc lenses 4 and 5 have the same radially-symmetrical refractive index profile and the same length L, the radiation source on the end surface 4b is imaged onto the end surface 5b. The radiation source image is then again situated on the optical axis 6.

The phase grating 7 which is arranged in the parallel radiation path between the Selfoc lenses 4 and 5, in addition to the zeroth diffraction order, now forms additional images of the point-shaped radiation source at the locations of the ±1st diffraction orders. These orders are situated at a distance 1 from the zeroth diffraction order, i.e. from the optical axis 6, on the end surface 5b.

For this purpose of the phase grating 7 has an optical path difference of $$H=(N-1)h=0.32\lambda \qquad (1)$$

Figure 3:
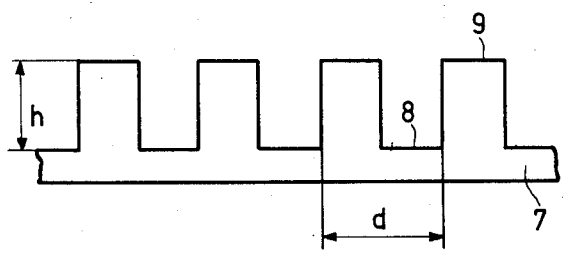
FIG. 3 represents a binary phase grating with a duty factor of 1:1.

In this equation N is the refractive index of the phase grating material, h the grating height of the phase grating 7 (see FIG. 3), and λ is the wavelength of the optical signal. The radiation which has been diffracted into the individual diffration orders can then be received by the three transmission lines 3a, 3b, and 3c, the transmission line 3b being situated on the optical axis 6. The distance 1 of the ±1st diffraction orders from the optical axis 6 is then $$l = [(\lambda f)/d], \quad (2)$$

where f is the focal length of the Selfoc lenses 4 and 5 and d is the grating period of the phase grating 7 (see FIG. 3). The diffraction orders are then situated on a line which extends through the optical axis 6, at right angles to the rulings of the phase grating 7, and which is situated on the end surface 5b of the Selfoc lens 5.

As the transmission lines 3a, 3b, and 3c have a diameter of typically 100 μm, the grating constant d of the phase grating 7, in accordance with the diffraction theory, will be $$d < [(\lambda \cdot f)/100 \, \mu m] \quad (3)$$

For a focal length of the Selfoc lenses 4 and 5 of f=3 mm and a wavelength of λ=1 μm the grating constant d according to equation (3) will have a value of d<30 μm.

When λ=1 μm the grating height h for a 1:3 power divider is 0.58 μm for N≈1.55, as will follow from equation (1). The resulting efficiency for the diffraction of radiation into the ±1st, 0th, −1st diffraction orders is 86.5%, while the power losses will be approximately 0.64 dB.

For a 1:2 power divider, in which the applied signal power is distributed among two transmission lines (for example 3a and 3b in FIG. 2), the optical path difference to be selected for a phase grating 7' (not shown) will be $$H' = (N'-1)h' = 0.5\lambda \quad (4).$$

Because of this optical path difference H' the radiation is now diffracted into the ±1st diffraction orders of the phase grating 7'. If λ=1 μm a value of h'=0.91 μm will be obtained for the grating height of a corresponding phase grating 7'. The resulting efficiency for the diffraction in the +1st and −1st diffraction orders will be approximately 81% for such a 1:2 power divider, while the lower losses will be approximately 0.9 dB.

FIG. 3 represents a cross-sectional view of phase grating 7 (or 7') for a 1:2 or 1:3 power divider. It takes the form of a binary phase grating 7 with a rectangular grating profile. The grating has a duty factor of at least substantially 1:1, i.e. a grating period do which for one half is covered by grating dates 8 or grating hills 9. Such a phase grating 7 may, for example, consist of a structured plastics such as PVC (see Knop, Optics, Comm., Vol. 18, 298 (1976)) or may be formed directly in one of the facing end surfaces 4a and 5a of the Selfoc lenses 4, 5 by means of photolithographic techniques in combination with a wet chemical etching process.

A 1:4 power divider is obtained by using two phase gratings 7', which each have an optical path difference H'=0.5λ. The grating lines of the two phase gratings 7' between the Selfoc lenses 4 and 5 are then rotated through an angle φ of preferably φ=60° or φ=90° relative to each other. Such a 1:4 power divider has power losses of approximately 1.8 dB.

Figures 4A, 4B:
FIGS. 4a and 4b, respectively, represent outgoing glass fibers of a 1:4 and a 1:9 power divider packed as densely as possible.

For a rotation through φ=60° a rhombic distribution of the diffraction orders is obtained on the outer end surface 5b of the Selfoc lens 5. FIG. 4a shows correspondingly arranged transmission lines 10, which receive the radiation that has been diffracted into the four diffraction orders. When the distance 1 between the diffraction orders has been selected appropriately, the transmission lines 10 can be packed as densely as possible.

Alignment of the transmission lines 10 relative to each other and to the diffraction orders may then be effected in a simple manner by means of a rhombic sleeve 11.

When the two phase gratings 7' are rotated through an angle of φ=90° relative to each other this results in a two-dimensional checkerboard-like phase grating. This phase grating may be formed, for example, by etching a binary phase grating in one of the facing end surfaces 4a and 5a of the Selfoc lenses in a single process, such as by means of photolithographic techniques.

The manufacture of 1:9 power dividers, in which the incoming signal power is uniformly distributed among nine transmission fibers 12 (FIG. 4b) is effected by using two phase gratings 7, which each have an optical path difference of H=0.32λ and which are rotated relative to each other. Such 1:9 power dividers have power losses of only 1.3 dB. In this case the rotation of the two phase gratings 7 through φ=60° relative to each other also produces a rhombic pattern of diffraction orders. When the distances between the diffraction orders have been selected appropriately, these orders can be coupled into the transmission fibers 12, which have been packed as closely as possible. The transmission fibers 12 can then readily be aligned relative to each other by means of a rhombic sleeve 13.

In the case of a rotation of the two phase gratings 7 through φ=90° relative to each other a checkerboard-like phase grating is again obtained. This, too, may be formed, for example, by etching a grating in one of the facing end surfaces 4a and 5a of the Selfoc lenses 4 and 5.

It is possible to obtain 1:6 power dividers, in which the incoming signal power is uniformly distributed among six transmission lines, by means of two one-dimensional phase gratings, of which one grating has an optical path difference of H=0.32λ and the other an optical path difference of H'=0.5λ. The two gratings are rotated relative to each other through an angle φ, which is suitable φ=60° or 90°. Such dividers have power losses of only 1.55 dB.

In the case of the 1:6 power dividers the individual phase grating may be formed in one of the facing end surfaces 4a and 5a of the Selfoc lenses 4 and 5, for example, by reactive sputtering or by wet chemical etching. A suitable angle can then be obtained between the grating lines of the phase gratings by rotating the Selfoc lenses relative to each other.

The aligned power dividers, whose Selfoc lenses are cemented to each other and to the phase gratings and the glass fibers, may be molded into a solid block having one incoming glass fiber (receiving line) and a plurality of outgoing glass fiber (transmission lines) using an epoxy resin or other suitable bonding agent, so that a mechanically stable device which cannot become misaligned is obtained. The ends of the relevant glass fibers may then be provided with connectors, so that they can be coupled to further glass fibers.

Furthermore, the Selfoc lenses 4 and 5 may also be replaced by other lenses or lens systems with suitable optical imaging properties. The receiving lines 2 and the transmission lines 3 should then be positioned accordingly by other means. For example, the phase gratings may be arranged in the pupil of a biconvex lens or between two biconvex lenses.

What is claimed is:

1. An optical power divider comprising:
   first and second imaging devices, each of which can convert a point light source into parallel rays and can convert parallel rays into a point light source; and
   first and second optical gratings situated between the imaging devices such that parallel rays, produced by the imaging devices from point light sources, will pass through the gratings, said gratings being plane, one-dimensional, binary phase gratings each having a rectangular groove profile and each having a duty factor of substantially 1:1;
   characterized in that:
   the optical path difference, $H=(N-1)h$, of the first grating is substantially given by $H=0.32\lambda+n\lambda$, where N is the refractive index of the grating material, h is the grating height, $\lambda$ is the wavelength of the light being divided, and $n=0, 1, 2\ldots$;
   the optical path difference of the second grating is substantially $0.32\lambda+m\lambda$, here $m=0, 1, 2\ldots$; and
   the two gratings are rotated relative to each other.

2. An optical power divider comprising:
   first and second imaging devices, each of which can convert a point light source into parallel rays and can convert parallel rays into a point light source; and
   first and second optical gratings situated between the imaging devices such that parallel rays, produced by the imaging devices from point light sources, will pass through the gratings, and gratings being plane, one-dimensional, binary phase gratings each having a rectangular groove profile and each having a duty factor of substantially 1:1;
   characterized in that:
   the optical path difference, $H=(N-1)h$, of the first grating is substantially given by $H=0.32\lambda+n\lambda$, where N is the refractive index of the grating material, h is the grating height, $\lambda$ is the wavelength of the light being divided, and $n=0, 1, 2\ldots$;
   the optical path difference of the second grating is substantially $0.5\lambda+m\lambda$, where $m=0, 1, 2\ldots$; and
   the two gratings are rotated relative to each other.

3. An optical power divider comprising:
   first and second imaging devices, each of which can convert a point light source into parallel rays and can convert parallel rays into a point light source; and
   first and second optical gratings situated between the imaging devices such that parallel rays, produced by the imaging devices from point light sources, will pass through the gratings, said gratings being plane, one-dimensional, binary phase gratings each having a rectangular groove profile and each having a duty factor of substantially 1:1;
   characterized in that:
   the optical path difference, $H=(N-1)h$, of the first grating is substantially given by $H=0.5\lambda+n\lambda$, where N is the refractive index of the grating material, h is the grating height, $\lambda$ is the wavelength of the light being divided, and $n=0, 1, 2\ldots$;
   the optical path difference of the second grating is substantially $0.5\lambda+m\lambda$, where $m=0, 1, 2\ldots$; and
   the two gratings are rotated relative to each other.

4. An optical power divider as claimed in claim 1, 2, or 3, characterized in that the imaging devices are Selfoc lenses having a common optical axis, and the phase gratings are perpendicular to the optical axis.

5. An optical power divider as claimed in claim 4, characterized in that the angle at which the gratings are rotated relative to each other is substantially 60°.

6. An optical power divider as claimed in claim 5, characterized in that at least one grating is formed on an end of one of the Selfoc lenses.

7. An optical power divider as claimed in claim 6, characterized in that both gratings are formed in ends of the Selfoc lenses.

8. An optical power divider as claimed in claim 6, characterized in that both gratings are formed in an end of one of the Selfoc lenses to produce a two-dimensional checkerboard-like grating.

9. An optical power divider as claimed in claim 8, characterized in that the phase gratings are formed by reactive sputtering.

10. An optical power divider comprising:
    first and second imaging devices, each of which can convert a point light source into parallel rays and can convert parallel rays into a point light source; and
    an optical grating situated between the imaging devices such that parallel rays, produced by the imaging devices from point light sources, will pass through the grating;
    characterized in that:
    the grating is a plane, one-dimensional, binary phase grating having a rectangular groove profile and having a duty factor of substantially 1:1; and
    the optical path difference, $H=(N-1)h$, is substantially given by $H=0.32\lambda+n\lambda$, where N is the refractive index of the grating material, h is the grating height, $\lambda$ is the wavelength of the light being divided, and $n=0, 1, 2\ldots$.

11. An optical power divider comprising:
    first and second imaging devices, each of which can convert a point light source into parallel rays and can convert parallel rays into a point light source; and
    an optical grating situated between the imaging devices such that parallel rays, produced by the imaging devices from point light sources, will pass through the grating;
    characterized in that:
    the grating is a plane, one-dimensional, binary phase grating having a rectangular groove profile and having a duty factor of substantially 1:1; and
    the optical path difference, $H=(N-1)h$, is substantially given by $H=0.5\lambda+n\lambda$, where N is the refractive index of the grating material, h is the grating height, $\lambda$ is the wavelength of the light being divided, and $n=0, 1, 2\ldots$.

* * * * *